United States Patent [19]

Hausmann

[11] 4,069,972
[45] Jan. 24, 1978

[54] HEAT SYSTEMS FOR VEHICLES
[75] Inventor: Winfried Hausmann, Klein-Lobke, Germany
[73] Assignee: Massey-Ferguson Services N.V., Curacao, Netherlands Antilles
[21] Appl. No.: 714,678
[22] Filed: Aug. 16, 1976
[30] Foreign Application Priority Data
   Aug. 16, 1975 United Kingdom ............... 34183/75
[51] Int. Cl.² ............................................. B60H 1/02
[52] U.S. Cl. ................................ 237/12.3 R; 60/456; 237/81; 184/104 A
[58] Field of Search ................. 237/12.3 R, 12.4, 8 B, 237/81; 60/456; 244/118 P; 184/104 A, 104 B

[56] References Cited
U.S. PATENT DOCUMENTS 2,306,379 12/1942 Conradson ...................... 60/456 UX
3,187,498 6/1965 Firth et al. ......................... 60/456 X Primary Examiner—William E. Wayner
Attorney, Agent, or Firm—Thomas P. Lewandowski

[57] ABSTRACT

A vehicle having an operators enclosure and an hydraulic circuit is provided with a heat exchanger to warm the enclosure. The heat exchanger is supplied with fluid from the return side of the hydraulic circuit thus eliminating the conventional engine coolant pipes.

3 Claims, 2 Drawing Figures

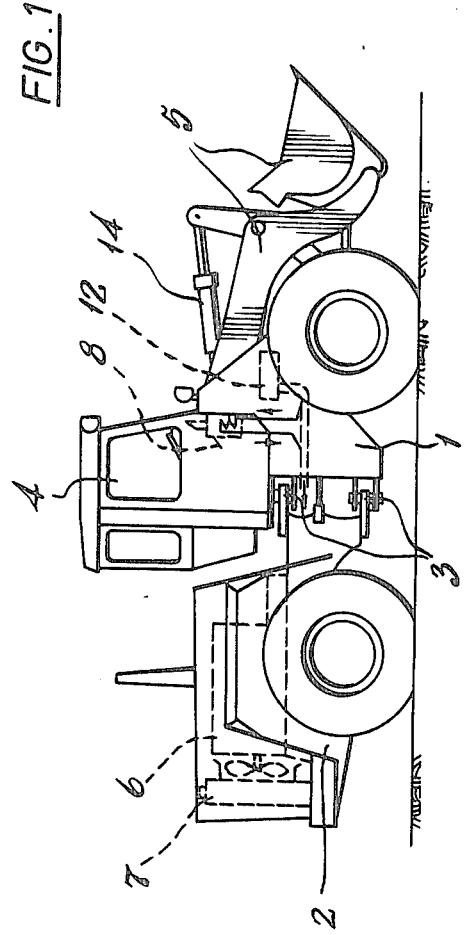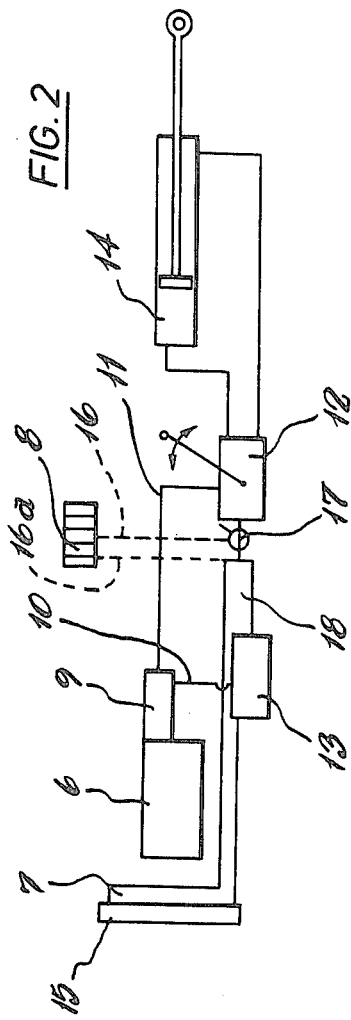

HEAT SYSTEMS FOR VEHICLES

The invention relates to vehicles and in particular to centre pivot steered vehicles equipped with a hydraulic unit, such as wheel loaders, etcetera, in which the driving unit is situated on one part of the chassis and a heatable driver's cab and working equipment on the other part.

In known vehicles of this kind it is usual for the heating unit in the driver's cab to be driven by the cooling water of the engine. This, however, necessitates the use of tubes or hoses and joints to convey the cooling water from the driving unit situated on one part of the chassis to the driver's cab situated on the other part. These pipes are relatively long, which leads to loss of heat and also hinders the work of the pivot joint inserted between the two parts of the chassis, quite apart from the fact that the pipes are subjected to a particularly strong mechanical stress when the vehicle is running and are therefore easily damaged.

It is an object of the present invention to obviate or mitigate the above disadvantages.

According to the present invention there is provided a vehicle having a prime mover, an hydraulic circuit supplied with oil from a pump driven by the prime mover, and an operators enclosure including a heat exchanger, said heat exchanger being supplied with fluid from said hydraulic circuit.

Preferably said heat exchanger is supplied with fluid by pipes connected in parallel with a low pressure zone of said hydraulic circuit.

Preferably also said vehicle is provided with a chassis formed in two parts and connected by a joint for pivotal movement about a vertical axis, said engine being located on one of said parts and said operators enclosure being located on another of said parts.

Preferably also the connection between the heat exchanger pipes and the low pressure region includes a variable control device for varying the flow through the heat exchanger.

An embodiment of the present invention will now be described by way of example only with reference to the accompanying drawings in which:

FIG. 1 shows a side view of a pivotsteered wheel loader, and

FIG. 2 a circuit diagram representing the hydraulic circuit of the vehicle shown in FIG. 1.

The vehicle comprises a front part 1 of the chassis and a rear part 2, both of which are connected by a pivot joint 3 lying about midway between the axles. On part 1 of the chassis is the driver's cab 4 with the working equipment, the shovel 5 and the operational elements necessary thereto. On the rear part 2 of the chassis is the engine 6 with the radiator 7 and the structural parts appertaining to the drive. In the driver's cab there is a heating unit 8, which can be varied between fully on or fully off according to the time of year.

As can be seen from FIG. 2 (the circuit diagram), a hydraulic oil pump 9 is connected with the engine 6 and supplies fluid to either a control device 12 or an oil collecting tank 13 by pipes 10 and 11. By means of the control device 12 a hydraulic cylinder 14 is controlled from the driver's cab 4 to operate the loading mechanism 5.

The hydraulic oil, which becomes heated up when the vehicle is working, is cooled down in an oil cooler 15.

The heat exchanger belonging to the heating unit 8 is connected by pipes 16, 16a and a regulating device 17 in parallel with a return pipe 18 leading from the control device 12 to the oil tank 13. By means of the regulating device 17 the hot hydraulic oil can be conveyed through the heat exchanger in the heating unit 8 and thus used as working fluid in the heating unit. The regulating device 17 which may be a valve of any suitable form to allow variable flow through the pipes 16, 16a can be operated to vary the flow, or alternatively to stop the influx of the hydraulic oil to the heating unit 8.

As can be seen, the hydraulic oil pipes run directly below the floor of the driver's cab 4, so that there is no difficulty in leading branches therefrom to the heating unit 8.

What we claim is:

1. A vehicle having an engine and a chassis formed in two parts which are connected by a joint for pivotal movement about a vertical axis, a hydraulic circuit supplied with oil from a pump driven by said engine, and an operators enclosure including a heat exchanger, said heat exchanger being supplied with fluid from said hydraulic circuit, said engine being located on one of said parts and said operators enclosure being located on another of said parts.

2. The vehicle of claim 1 wherein said heat exchanger is supplied with fluid by pipes connected in parallel with a low pressure zone of said hydraulic circuit.

3. The vehicle of claim 2 wherein the connection between the heat exchanger pipes and the low pressure region includes a variable control device for varying the flow through the heat exchanger.

* * * * *